UNITED STATES PATENT OFFICE.

ROSE YEGANIAN, OF YONKERS, NEW YORK.

TOOTH-POWDER.

1,073,725.
No Drawing.

Specification of Letters Patent. Patented Sept. 23, 1913.

Application filed January 4, 1913. Serial No. 740,226.

*To all whom it may concern:*

Be it known that I, ROSE YEGANIAN, a citizen of the United States, residing at Yonkers, in the county of Westchester and State of New York, have invented a new and useful Tooth-Powder, of which the following is a specification.

The present invention relates to improvements in tooth powders, the object of the present invention being the production of a tooth powder, the ingredients of which are so compounded as to, when used, strengthen the gums, cleanse the teeth and purify the breath.

In compounding the present tooth powder, ground cloves, salt (sodium chlorid), rhubarb, desiccated and pulverized pineapple and pulverized charcoal, are employed.

The preferred proportions of these ingredients are as follows:—ground cloves, 1 ounce; salt, 2 ounces; rhubarb, 8 ounces; pineapple, 8 ounces; charcoal, 8 ounces. These ingredients have to be in a pulverized state so that when the same are properly mixed and compounded a dry powder is the resultant.

In applying the powder, the same is applied by a tooth brush or other means in a moist state.

The pineapple is cut up in small particles and desiccated and when thoroughly dried is pulverized before mixing with the other ingredients. The comminuted and desiccated pineapple, when moist provides a fibrous substance in the tooth powder, that takes the place of an abrasive, while the acid also carried thereby, assists in cutting the tartar accumulation from the teeth.

What is claimed is:

A tooth powder composed of pulverized cloves, salt, rhubarb, charcoal, and pulverized and desiccated pineapple pulp.

In testimony that I claim the foregoing as my own, I have hereto affixed my signature in the presence of two witnesses.

ROSE YEGANIAN.

Witnesses:
  MATTHEW A. BRODERICK,
  SAML. NADDER.